(12) United States Patent
Umemiya et al.

(10) Patent No.: US 11,352,105 B2
(45) Date of Patent: Jun. 7, 2022

(54) ESTIMATION METHOD, TRAINING METHOD, STORAGE MEDIUM, AND ESTIMATION DEVICE

(71) Applicant: FUJITSU LIMITED, Kawasaki (JP)

(72) Inventors: Shigeyoshi Umemiya, Fujisawa (JP); Masashi Yamaumi, Kawasaki (JP); Takuro Ikeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/984,318

(22) Filed: Aug. 4, 2020

(65) Prior Publication Data

US 2021/0047012 A1 Feb. 18, 2021

(30) Foreign Application Priority Data

Aug. 14, 2019 (JP) .............................. JP2019-148984

(51) Int. Cl.
*B63B 59/00* (2006.01)
*G06N 20/00* (2019.01)
*B63B 79/20* (2020.01)

(52) U.S. Cl.
CPC .............. *B63B 59/00* (2013.01); *B63B 79/20* (2020.01); *G06N 20/00* (2019.01)

(58) Field of Classification Search
CPC ......... B63B 59/00; B63B 59/04; B63B 79/20; B63B 79/30; G06N 20/00
See application file for complete search history.

(56) References Cited

U.S. PATENT DOCUMENTS

| | | | |
|---|---|---|---|
| 2010/0169323 A1* | 7/2010 | Liu | G06K 9/6276 707/748 |
| 2018/0341729 A1* | 11/2018 | Kowalyshyn | G06F 30/15 |
| 2021/0129951 A1* | 5/2021 | Kvernvik | H04W 4/40 |

FOREIGN PATENT DOCUMENTS

| | | |
|---|---|---|
| JP | 2014-013145 A | 1/2014 |
| JP | 2016-133992 A | 7/2016 |
| JP | 2018-027740 A | 2/2018 |

* cited by examiner

*Primary Examiner* — Roy Y Yi
*Assistant Examiner* — Geoffrey T Evans
(74) *Attorney, Agent, or Firm* — Fujitsu Patent Center

(57) ABSTRACT

An estimation method executed by a computer, the estimation method includes estimating a fouling degree of a target ship based on an accumulation period since a most recent maintenance on the target ship; selecting, as training data, one piece of data that has a fouling degree that resembles the estimated fouling degree, from among a plurality of pieces of data, when generating a machine learning model for estimating an amount of fuel consumption due to navigation; and generating the machine learning model based on the selected training data.

10 Claims, 5 Drawing Sheets

ESTIMATION METHOD, TRAINING METHOD, STORAGE MEDIUM, AND ESTIMATION DEVICE

CROSS-REFERENCE TO RELATED APPLICATION

This application is based upon and claims the benefit of priority of the prior Japanese Patent Application No. 2019-148984, filed on Aug. 14, 2019, the entire contents of which are incorporated herein by reference.

FIELD

Embodiments of the present invention relate to an estimation method, a training method, an estimation program, and an estimation device.

BACKGROUND

Conventionally, in ship operation, operation plan optimization represented by weather routing has been performed in order to operate the ship efficiently. In the weather routing, it is known that, taking into account the fact that marine organisms adhere to the submerged surface of the hull and the propeller outer surface to foul and reduce the propulsion, the operation plan of the in-service ship is optimized in a state with higher accuracy of propulsion performance prediction. For example, Japanese Laid-open Patent Publication No. 2018-27740, Japanese Laid-open Patent. Publication No, 2016-133992, Japanese Laid-open Patent Publication No. 2014-13145, and the like are disclosed as related art.

SUMMARY

According to an aspect of the embodiments, an estimation method executed by a computer, the estimation method includes estimating a fouling degree of a target ship based on an accumulation period since a most recent maintenance on the target ship; selecting, as training data, one piece of data that has a fouling degree that resembles the estimated fouling degree, from among a plurality of pieces of data, when generating a machine learning model for estimating an amount of fuel consumption due to navigation; generating the machine learning model based on the selected training data; and using the generated machine learning model to estimate the amount of fuel consumption of the target ship according to constraint conditions that relate to the target ship.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the maintenance of the ship is not taken into consideration. For example, the state of the hull greatly changes because of the maintenance, and the state of the hull keeps varying gradually depending on the berthing time and the like thereafter. For this reason, in simple prediction of the propulsion performance based on the lapse of time and the navigation distance, the accuracy is sometimes degraded. In view of the above, it is desirable to assist in the optimization of the ship operation plan.

Figure 1:
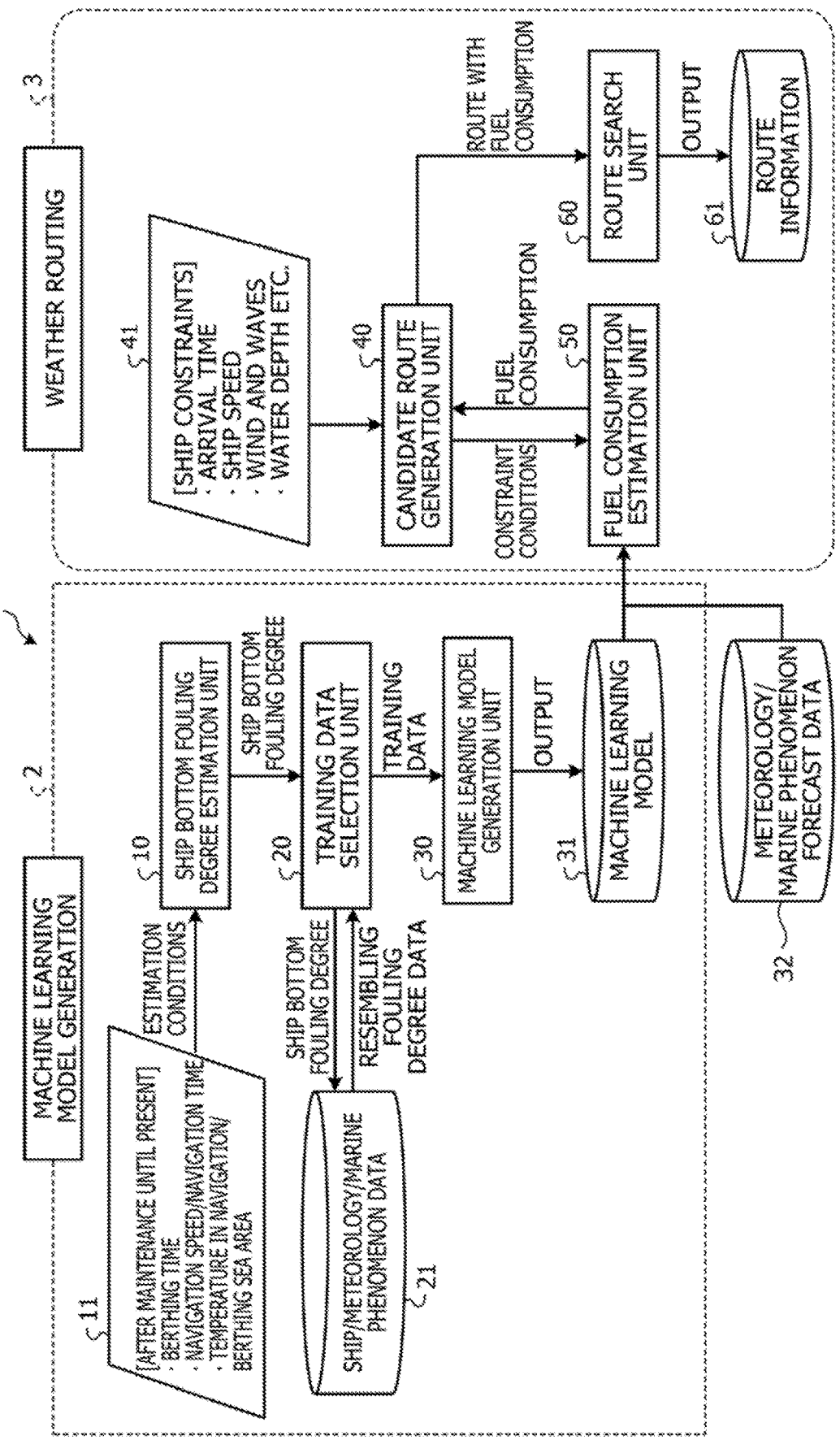
FIG. 1 is a block diagram illustrating an exemplary functional configuration of an information processing device according to an embodiment.

Hereinafter, an estimation method, a training method, an estimation program, and an estimation device according to embodiments will be described with reference to the drawings. The configurations with the same functions in the embodiments are denoted by the same reference signs, and the redundant description will be omitted. Note that the estimation method, the training method, the estimation program, and the estimation device described in the following embodiments are merely examples and do not limit the embodiments. In addition, each embodiment below may be appropriately combined within the scope of no contradiction, FIG. 1 is a block diagram of an exemplary functional configuration of an information processing device according to an embodiment. As illustrated in FIG. 1, the information processing device 1 is a device that performs machine learning model generation 2 and weather routing 3 for a target ship that is a prediction target, and for example, a personal computer (PC) or the like can be applied.

In the machine learning model generation 2, for the target ship as a prediction target, a machine learning model 31 configured to estimate the amount of fuel consumption due to navigation of the target ship is generated by supervised training using past ship/meteorology/marine phenomenon data 21 including the amount of fuel consumption of the same or the same type ship as the target ship.

The weather routing 3 uses the generated machine learning model 31 to estimate the amount of fuel consumption of the target ship according to constraint conditions relating to the target ship, and to search for a route of the target ship based on the estimated amount of fuel consumption.

Specifically, the information processing device 1 includes a ship bottom fouling degree estimation unit 10, a training data selection unit 20, a machine learning model generation unit 30, a candidate route generation unit 40, a fuel consumption estimation unit 50, and a route search unit 60.

The ship bottom fouling degree estimation unit 10 is a processing unit that estimates the ship bottom fouling degree (hereinafter, referred to as fouling degree) indicating the current extent of dirt on the submerged surface and the propeller outer surface of the target ship, on the basis of estimation condition information 11 on the target ship. That is, the ship bottom fouling degree estimation unit 10 is an example of a fouling degree estimation unit.

The estimation condition information 11 is information indicating the state of the target ship from the time after the most recent maintenance until the present, and includes the berthing time, the navigation speed/navigation time, and the temperature (seawater temperature) in the navigation/berthing sea area.

On the basis of an accumulation period from the time after the most recent maintenance on the target ship until the present, which is included in the estimation condition information 11, the ship bottom fouling degree estimation unit 10 estimates the current fouling degree of the target ship that has been cleaned by the most recent maintenance.

For example, marine organisms and other foulings are likely to adhere when the ship is berthed or when the ship speed is slow. Furthermore, since the activity of marine organisms is affected by the seawater temperature, how easily marine organisms adhere also changes depending on the seawater temperature.

The ship bottom fouling degree estimation unit 10 estimates the current fouling degree of the target ship after the most recent maintenance, using the above-mentioned characteristics relating to the foulings. Specifically, the ship bottom fouling degree estimation unit 10 estimates the fouling degree by working out a period in which the berthing time and the navigation time at a navigation speed equal to or less than a predetermined navigation speed included in the estimation condition information 11 are accumulated, and weighting the worked-out accumulation period according to the seawater temperature in the navigation/berthing sea area.

The training data selection unit 20 selects a data set having a fouling degree resembling the current fouling degree of the target ship estimated by the ship bottom fouling degree estimation unit 10, from the ship/meteorology/marine phenomenon data 21 as training data for generating the machine learning model 31.

The ship/meteorology/marine phenomenon data 21 is past data of the same or the same type ship as the target ship, and is data that collects the ship state, the meteorological state, and the state of marine phenomena during navigation. Specifically, the ship/meteorology/marine phenomenon data 21 includes information on the fouling degree, the ship speed, the amount of fuel consumption per unit time, and the like of the ship during navigation, as the ship state. Furthermore, the ship/meteorology/marine phenomenon data 21 includes information on the wind speed, the wind direction, and the like during navigation, as the meteorological state. In addition, the ship/meteorology/marine phenomenon data 21 includes information on the wave height, the wave direction, the ocean current speed, the ocean current direction, and the like during navigation, as the state of marine phenomena.

The training data selection unit 20 extracts data with a fouling degree resembling the fouling degree estimated by the ship bottom fouling degree estimation unit 10 within a predetermined width (for example, a range of ±10), from the ship/meteorology/marine phenomenon data 21 as resembling fouling degree data, and outputs the extracted data to the machine learning model generation unit 30 as training data.

The machine learning model generation unit 30 is a processing unit that generates the machine learning model 31 by performing supervised training based on training data selected by the training data selection unit 20. Specifically, the machine learning model generation unit 30 adopts the amount of fuel consumption per unit time included in the training data as the correct answer (objective variable). Furthermore, the machine learning model generation unit 30 generates the machine learning model 31 for estimating the amount of fuel consumption due to navigation of the target ship by performing machine learning using, as explanatory variables, the ship state other than the amount of fuel consumption, the meteorological state, the state of marine phenomena, and the like included in the training data.

The candidate route generation unit 40 is a processing unit that generates a route as a candidate (hereinafter, referred to as candidate route) from the departure place to the arrival place, on the basis of route constraint information 41 including the departure place, the departure date and time, the arrival place, the arrival date and time, the ship speed, the wind and waves, the water depth, and the like relating to the target ship.

Specifically, the candidate route generation unit 40 creates a plurality of candidate routes that satisfy conditions such as the departure place, the departure date and time, the arrival place, and the arrival date and time in route conditions included in the route constraint information 41, Furthermore, the candidate route generation unit 40 notifies the fuel consumption estimation unit 50 of constraint conditions (ship conditions) relating to the fuel consumption, such as the generated candidate routes, the ship speed, the wind and waves, and the water depth, and acquires the amount of fuel consumption estimated by the fuel consumption estimation unit 50 for each candidate route. Accordingly, the candidate route generation unit 40 generates a plurality of candidate routes with the amount of fuel consumption.

The fuel consumption estimation unit 50 is a processing unit that uses the machine learning model 31 for the target ship generated by the machine learning model generation unit 30 to estimate the amount of fuel consumption of the target ship according to the constraint conditions of the candidate route, Specifically, the fuel consumption estimation unit 50 applies, to the machine learning model 31, values of the ship state (ship speed, water depth, and the like) included in the constraint conditions of the candidate route generated by the candidate route generation unit 40, and forecast values of the meteorological state and the state of marine phenomena in meteorology/marine phenomenon forecast data 32 corresponding to the candidate route. Accordingly, the fuel consumption estimation unit 50 obtains an estimated value of the amount of fuel consumption when navigating on the candidate route (for example, the amount of fuel consumption per unit time at each point along the candidate route). Subsequently, the fuel consumption estimation unit 50 outputs the estimated value of the amount of fuel consumption obtained for the candidate route to the candidate route generation unit 40.

The route search unit 50 is a processing unit that searches for an optimal route that minimizes fuel consumption, based on the amount of fuel consumption of the plurality of candidate routes generated by the candidate route generation unit 40, and outputs the found route.

Specifically, for the plurality of candidate routes with the amount of fuel consumption generated by the fuel consumption estimation unit 50, the route search unit 60 integrates the amount of fuel consumption per unit time at each point along the candidate route, and thus obtains the total amount of fuel consumption for each candidate route. Subsequently, the route search unit 60 works out a candidate route that minimizes the total amount of fuel consumption, as an optimal route on the basis of the total amount of fuel consumption of each candidate route, and outputs information on the obtained optimal route as route information 61.

As described above, the information processing device 1 is an example of a prediction device. Note that, in the present embodiment, a configuration in which the generation of the machine learning model 31 (machine learning model generation 2) and the prediction using the machine learning model 31 (weather routing 3) are integrally performed in one information processing device 1 is exemplified; however, the machine learning model generation 2 and the weather routing 3 may be implemented by information processing devices 1 different from each other.

Figure 2:
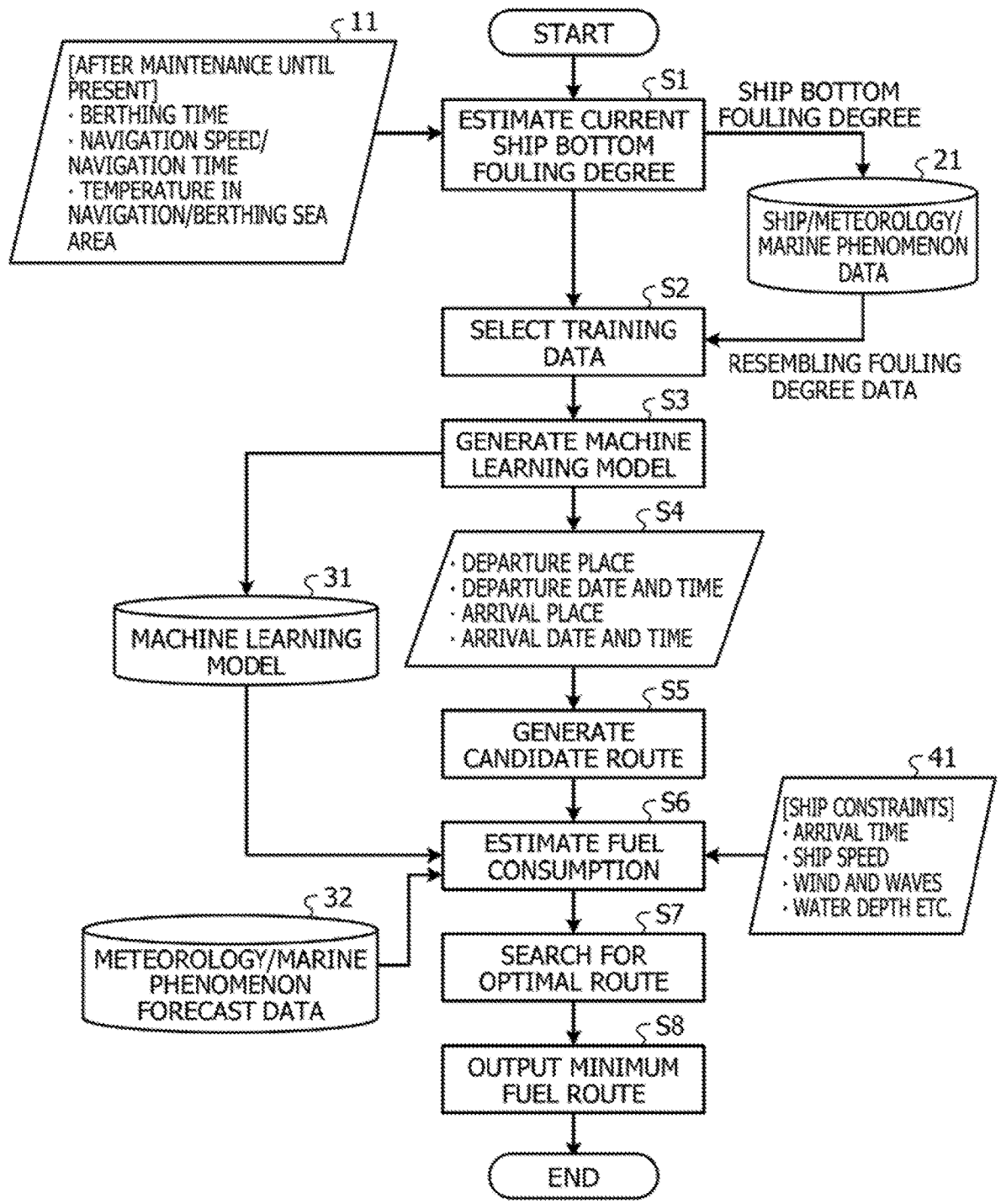
FIG. 2 is a flowchart illustrating exemplary working of the information processing device according to the embodiment.

Next, details of the working of the information processing device 1 will be described. FIG. 2 is a flowchart illustrating exemplary working of the information processing device 1 according to the embodiment.

As illustrated in FIG. 2, when processing relating to the weather routing for the target ship is started, the ship bottom fouling degree estimation unit 10 estimates the current fouling degree on the basis of the estimation condition information 11 on the target ship input by a user or the like (S1).

Subsequently, the training data selection unit 20 selects the training data by extracting resembling fouling degree data having a fouling degree resembling the fouling degree estimated by the ship bottom fouling degree estimation unit 10, from the ship/meteorology/marine phenomenon data 21 (S2).

Figure 3:
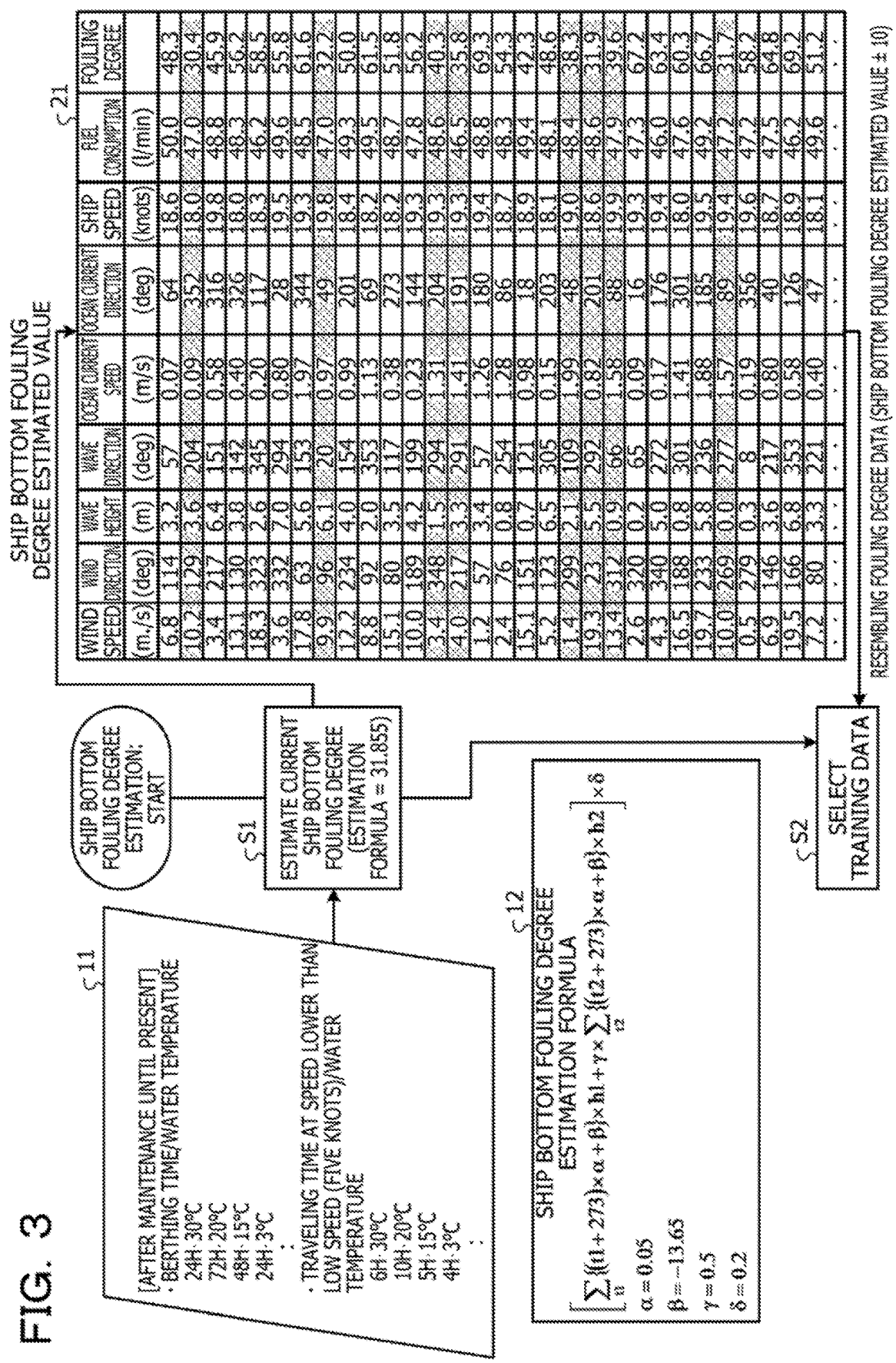
FIG. 3 is an explanatory diagram explaining ship bottom fouling degree estimation and training data selection.

FIG. 3 is an explanatory diagram explaining ship bottom fouling degree estimation and training data selection. As illustrated in FIG. 3, in the current fouling degree estimation (S1) on the target ship, the fouling degree is worked out by applying values in the estimation condition information 11 to a ship bottom fouling degree estimation formula 12.

Specifically, the estimation condition information 11 includes information on the berthing time and the water temperature (seawater temperature) from the time after the most recent maintenance until the present. Furthermore, the estimation condition information 11 includes information on the navigation time and the water temperature (seawater temperature) at a speed lower than a low speed (five knots).

Assuming the berthing time and the water temperature (seawater temperature) as h1 and t1 and assuming the navigation time and the water temperature (seawater temperature) at the low speed as h2 and t2 in the estimation condition information 11, the ship bottom fouling degree estimation unit 10 works out the estimated value of the fouling degree by substituting the assumed values into the ship bottom fouling degree estimation formula 12. Note that $\alpha$, $\beta$, $\gamma$, $\delta$, and the like are set to any values (for example, $\alpha=0.05$, $\beta=-13.65$, $\gamma=0.5$, $\delta=0.2$). In the illustrated example, 31.855 is obtained as the estimated value of the fouling degree.

Subsequently, the training data selection unit 20 extracts resembling fouling degree data having a fouling degree resembling (estimated value±10) the estimated fouling degree (for example, 31.855) from the ship/meteorology/marine phenomenon data 21, and selects the extracted resembling fouling degree data as training data. In the illustrated example, data within a range of the fouling degree of 31.855±10 (hatched portions) is selected from the ship/meteorology/marine phenomenon data 21 as the training data.

Returning to FIG. 2, subsequently to S2, the machine earning model generation unit 30 generates the machine learning model 31 by performing supervised training based on the selected training data (53).

Subsequently, the candidate route generation unit 40 receives an input of the route constraint information 41 such as the departure place, the departure date and time, the arrival place, and the arrival date and time, by the user's input operation or the like (54). Subsequently, the candidate route generation unit 40 generates a plurality of candidate routes that satisfy route conditions included in the received route constraint information 41, such as the departure place, the departure date and time, the arrival place, and the arrival date and time (S5).

Subsequently, the fuel consumption estimation unit 50 refers to the machine learning model 31 for the target ship generated by the machine learning model generation unit 30 and the meteorology/marine phenomenon forecast data 32, and estimates the amount of fuel consumption according to the constraint conditions (ship conditions) in the route constraint information 41 in each of the candidate routes generated by the candidate route generation unit 40 (S6).

Subsequently, the route search unit 60 searches for an optimal route that minimizes fuel consumption, based on the amount of fuel consumption estimated by the fuel consumption estimation unit 50 from among the plurality of candidate routes generated by the candidate route generation unit 40 (S7), and outputs the route information 61 indicating a minimum fuel route (optimal route) that has been found (S8).

As described above, the information processing device 1 includes the ship bottom fouling degree estimation unit 10, the training data selection unit 20, the machine learning model generation unit 30, and the fuel consumption estimation unit 50. The ship bottom fouling degree estimation unit 10 estimates the fouling degree of the target ship based on the accumulation period since the most recent maintenance on the target ship. When generating the machine learning model 31 for estimating the amount of fuel consumption due to navigation, the training data selection unit 20 selects, as the training data, teacher data that has a fouling degree resembling the estimated fouling degree from teacher data (ship/meteorology/marine phenomenon data 21). The machine learning model generation unit 30 generates the machine learning model 31 for estimating the amount of fuel consumption due to navigation by performing supervised training based on the selected training data. The fuel consumption estimation unit 50 uses the generated machine learning model 31 to estimate the amount of fuel consumption of the target ship according to the constraint conditions relating to the target ship.

The information processing device 1 uses the machine learning model generated on the basis of the teacher data (resembling fouling degree data) resembling the fouling degree of the target ship estimated based on the accumulation period since the most recent maintenance on the target ship to predict the amount of fuel consumption, and thus can accurately estimate the amount of fuel consumption of the target ship. As described above, the information processing device 1 can assist in optimizing the operation plan of a ship by accurately estimating the amount of fuel consumption of the target ship.

Figure 4:
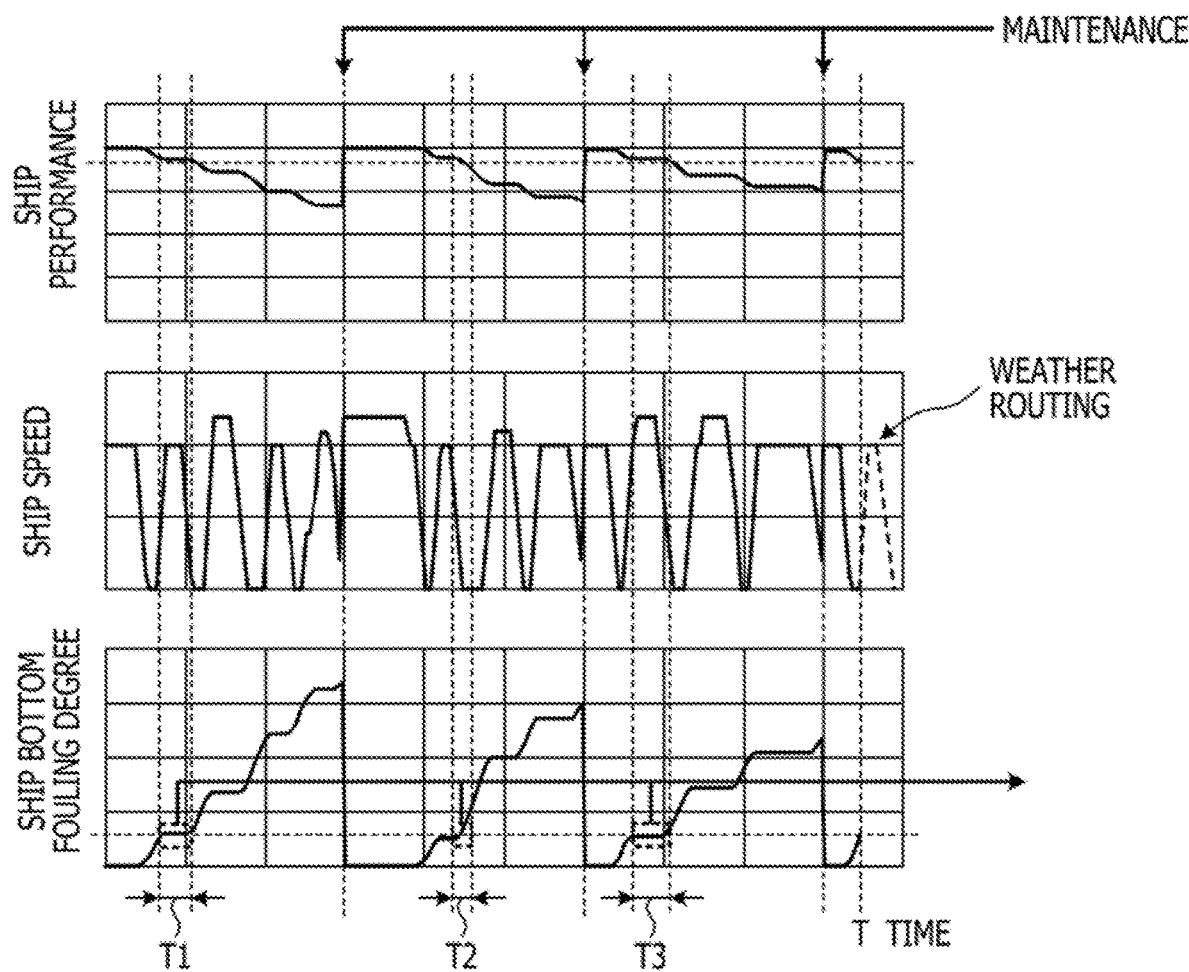
FIG. 4 is an explanatory diagram explaining weather routing in accordance with resembling fouling degree data.

FIG. 4 is an explanatory diagram explaining weather routing in accordance with the resembling fouling degree data. As illustrated in FIG. 4, the information processing device 1 estimates the fouling degree of the target ship based on the accumulation period from the most recent maintenance on the target ship of the weather routing to the current time T. Then, the information processing device 1 selects, as the training data, data in data periods T1 to T3 having fouling degrees resembling the fouling degree at the current time T from the ship/meteorology/marine phenomenon data 21, and generates the machine learning model 31 that predicts the amount of fuel consumption. That is, the information processing device 1 generates the machine learning model 31 by supervised training using data of which the ship performance after maintenance resembles the ship performance at the current time T in the ship/meteorology/marine phenomenon data 21. Since the information processing device 1 predicts the amount of fuel consumption using the machine learning model 31 thus generated, the amount of fuel consumption of the target ship can be accurately estimated.

Furthermore, the accumulation period since the most recent maintenance on the target ship includes a period in which the berthing time of the target ship is accumulated. For example, while the ship is berthed, marine organisms and other foulings are most likely to adhere to the submerged surface of the hull and the propeller outer surface. Therefore, by estimating the fouling degree by adding the berthing time of the target ship to the accumulation period, the estimation accuracy of the fouling degree can be improved.

In addition, the accumulation period since the most recent maintenance on the target ship includes a period in which a time during which the target ship navigated at a speed lower than a predetermined navigation speed is accumulated. For example, marine organisms and other foulings are likely to adhere when the ship speed is slow. Therefore, by estimating the fouling degree by adding the time during which the target ship navigated at a speed lower than the predetermined navigation speed to the accumulation period, the estimation accuracy of the fouling degree can be improved.

Moreover, the ship bottom fouling degree estimation unit 10 estimates the fouling degree by performing weighting according to the seawater temperature in the accumulation period. For example, since the activity of marine organisms is affected by the seawater temperature, how easily marine organisms adhere to the submerged surface of the hull and the propeller outer surface varies depending on the seawater temperature. Therefore, by estimating the fouling degree by performing weighting according to the seawater temperature, the estimation accuracy of the fouling degree can be improved.

Furthermore, the information processing device 1 includes the route search unit 60 that searches for the route of the target ship based on the amount of fuel consumption estimated by the fuel consumption estimation unit 50 and outputs the found route. Accordingly, the information processing device 1 can perform the weather routing on the basis of the amount of fuel consumption accurately estimated in consideration of the maintenance of the target ship, and can work out a proper route for the target ship that decreases the amount of fuel consumption.

Note that the respective components of each of the illustrated apparatus and devices are not necessarily physically configured as illustrated in the drawings. That is, the specific aspects of separation and integration of each of the apparatus and devices are not limited to the illustrated aspects, and all or part of the apparatus or devices can be functionally or physically separated and integrated in any unit, in accordance with various loads and use status.

Various processing functions executed with the information processing device 1 may be entirely or optionally partially executed on a central processing unit (CPU) (or a microcomputer, such as a microprocessor unit (MPU) or a micro controller unit (MCU)). Furthermore, it is needless to say that whole or any part of various processing functions may be executed by a program to be analyzed and executed on a CPU (or a microcomputer, such as an MPU or an MCU), or on hardware by wired logic. In addition, various processing functions executed with the information processing device 1 may be executed by a plurality of computers in cooperation though cloud computing.

Figure 5:
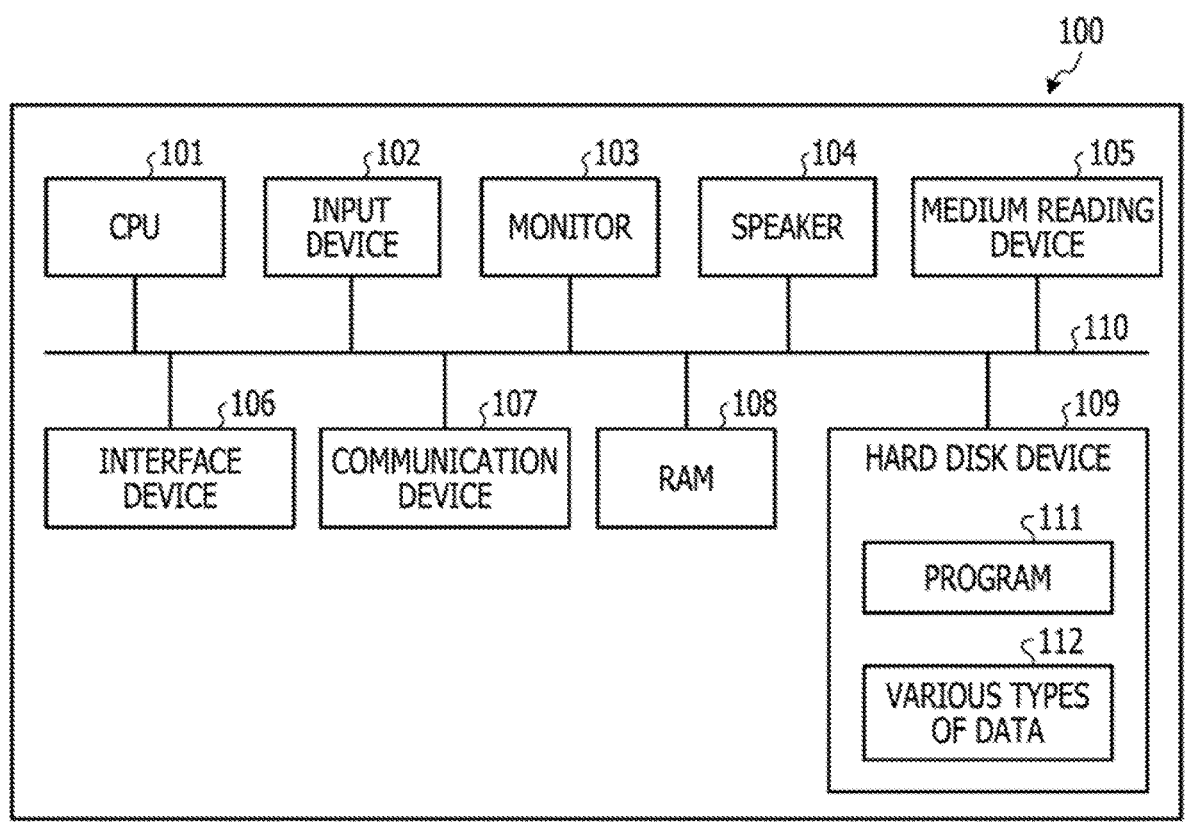
FIG. 5 is a block diagram illustrating an exemplary computer that executes a program.

Meanwhile, the various types of processing described in the above embodiment can be achieved by execution of a prepared program on a computer. Thus, there will be described below an example of a computer (hardware) that executes a program with functions similar to the functions in the above embodiment. FIG. 5 is a block diagram illustrating an exemplary computer that executes a program.

As illustrated in FIG. 5, a computer 100 includes a CPU 101 that executes various types of arithmetic processing, an input device 102 that receives data input, a monitor 103, and a speaker 104. In addition, the computer 100 includes a medium reading device 105 that reads a program and the like from a storage medium, an interface device 106 that is used for connecting to various devices, and a communication device 107 that makes communicative connection with an external device in a wired or wireless manner. Furthermore, the computer 100 also includes a random access memory (RAM) 108 that temporarily stores various types of information, and a hard disk drive 109. Moreover, each part (101 to 109) in the computer 100 is connected to a bus 110.

The hard disk drive 109 stores a program 111 that executes various types of processing described in the above embodiment. In addition, the hard disk drive 109 stores various types of data 112 to which the program 111 refers. The various types of data 112 corresponds to, for example, the estimation condition information 11, the ship/meteorology/marine phenomenon data 21, the machine learning model 31, the meteorology/marine phenomenon forecast data 32, the route constraint information 41, and the like. The input device 102 receives, for example, an input of operation information from an operator of the information processing device 1. The monitor 103 displays, for example, various screens operated by the operator. The interface device 106 is connected to, for example, a printing device. The communication device 107 exchanges various types of information with an external device connected via a communication cable or the like.

The CPU 101 reads the program 111 stored in the hard disk drive 109 and loads the program 111 into the RAM 108 to execute the program 111. Then, the CPU 101 executes the various types of processing. For example, in the case of the information processing device 1, the CPU 101 executes the program 111 to perform processing relating to the ship bottom fouling degree estimation unit 10, the training data selection unit 20, the machine learning model generation unit 30, the candidate route generation unit 40, the fuel consumption estimation unit 50, and the route search unit 60.

Note that, the program 111 may not be prestored in the hard disk drive 109. For example, the computer 100 may read and execute the program 111 stored in a storage medium that can be read by the computer 100.

The storage medium that is readable by the computer 100 corresponds to, for example, a portable recording medium such as a compact disk read only memory (CD-ROM), a digital versatile disk (DVD), or a universal serial bus (USB) memory, a semiconductor memory such as a flash memory, a hard disk drive, or the like. Alternatively, the program 111 may be prestored in a device connected to a public line, the Internet, a local area network (LAN), or the like, and the computer 100 may read the program 111 from the device and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An estimation method executed by a computer, the estimation method comprising:
   estimating a fouling degree of a target ship based on an accumulation period since a most recent maintenance on the target ship;
   selecting, as training data, one piece of data that has a fouling degree that resembles the estimated fouling degree, from among a plurality of pieces of data, when generating a machine learning model for estimating an amount of fuel consumption due to navigation; and
   generating the machine learning model based on the selected training data,
   wherein the accumulation period includes a period in which a time during which navigation at a speed lower than a predetermined navigation speed was kept is accumulated.

2. The estimation method according to claim 1, wherein the estimation method comprising using the generated machine learning model to estimate the amount of fuel consumption of the target ship according to constraint conditions that relate to the target ship; and the accumulation period includes a period in which a berthing time is accumulated.

3. The estimation method according to claim 1, wherein the estimating process includes the fouling degree estimates the fouling degree by performing weighting according to a seawater temperature in the accumulation period.

4. The estimation method according to claim 1, wherein a search for a route of the target ship is made based on the estimated amount of fuel consumption, and the found route is output.

5. A training method executed by a computer, the training method comprising:
   estimating a fouling degree of a target ship based on an accumulation period since a most recent maintenance on the target ship;
   selecting, as training data, one piece of data that has a fouling degree that resembles the estimated fouling degree, from among pieces of data, when generating a machine learning model for estimating an amount of fuel consumption due to navigation; and
   generating the machine learning model based on the selected training data,
   wherein the accumulation period includes a period in which a time during which navigation at a speed lower than a predetermined navigation speed was kept is accumulated.

6. A non-transitory computer-readable storage medium storing a program that causes a computer to execute a process, the process comprising:
   estimating a fouling degree of a target ship based on an accumulation period since a most recent maintenance on the target ship;
   selecting one piece of training data that has a fouling degree that resembles the estimated fouling degree, from among a plurality pieces of training data; and
   generating a machine learning model for estimating an amount of fuel consumption due to navigation, based on the selected training data,
   wherein the accumulation period includes a period in which a time during which navigation at a speed lower than a predetermined navigation speed was kept is accumulated.

7. An estimation device, comprising: a memory; and a processor coupled to the memory and the processor configured to: estimate a fouling degree of a target ship based on an accumulation period since a most recent maintenance on the target ship, select one piece of training data that has a fouling degree that resembles the estimated fouling degree, from among a plurality of pieces of training data; and generate a machine learning model for estimating an amount of fuel consumption due to navigation, based on the selected training data,
   wherein the accumulation period includes a period in which a time during which navigation at a speed lower than a predetermined navigation speed was kept is accumulated.

8. The estimation device according to claim 7, wherein the accumulation period includes a period in which a berthing time is accumulated.

9. The estimation device according to claim 7, wherein the processor is configured to estimate the fouling degree includes processing of estimating the fouling degree by performing weighting according to a seawater temperature in the accumulation period.

10. The estimation device according to claim 7, wherein a search for a route of the target ship is made based on the estimated amount of fuel consumption, and the found route is output.

* * * * *